May 4, 1948.   E. M. CALLENDER   2,440,892
CAPACITOR DISCHARGE WELDING SYSTEM
Filed Jan. 8, 1944   2 Sheets-Sheet 1

INVENTOR
Edwin M. Callender.
BY John R. Tarbox
ATTORNEY

May 4, 1948.  E. M. CALLENDER  2,440,832
CAPACITOR DISCHARGE WELDING SYSTEM
Filed Jan. 8, 1944  2 Sheets-Sheet 2

INVENTOR
Edwin M. Callender.
BY John R Tarbox
ATTORNEY

Patented May 4, 1948

2,440,892

UNITED STATES PATENT OFFICE 2,440,892

CAPACITOR DISCHARGE WELDING SYSTEM

Edwin M. Callender, Philadelphia, Pa., assignor to The Budd Company, Philadelphia, Pa., a corporation of Pennsylvania Application January 8, 1944, Serial No. 517,511

3 Claims. (Cl. 320—1)

This invention relates to energy storage and discharge systems with particular applicability to capacitor discharge welding for portable uses.

The development of aircraft and the necessity of making repairs on airplane hulls and supporting structures at points where the supply of power having requisite voltage and frequency characteristics is difficult to secure has resulted in a demand for a light and mobile welding unit which may be used efficiently under a wide range of power conditions.

Further, it is recognized that in ordinary resistance welding utilizing fixed voltage conditions there is generally speaking a marked loss in heat energy due primarily to the slowness of application of heat at the weld point. Consequently, the heat leakage is excessive. The use of capacitor discharge welding has been found to be effective in very materially reducing these heat losses.

Figure 1:
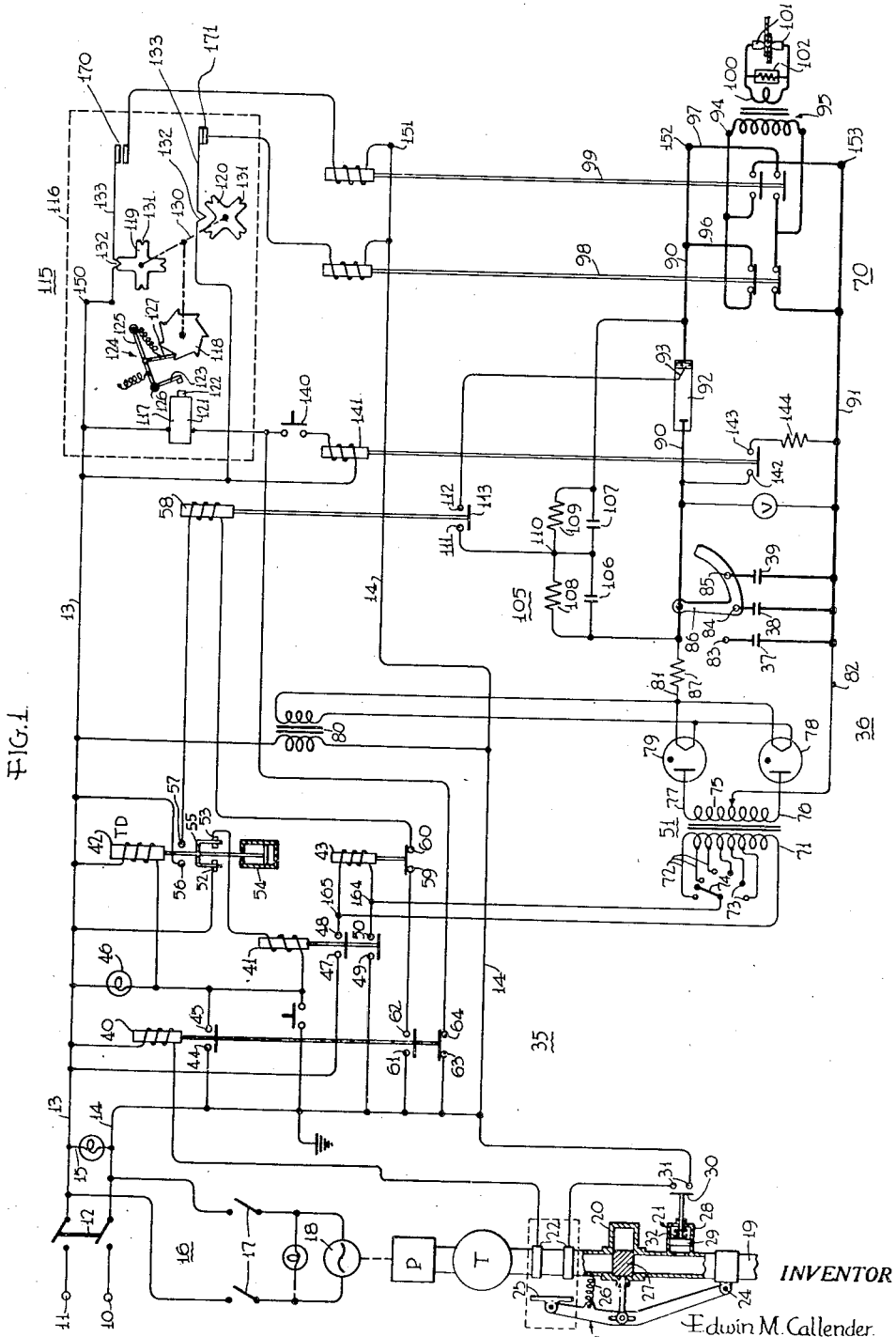
Figure 2:
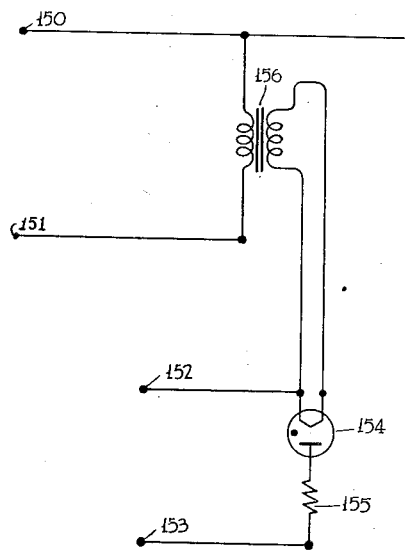
Figure 3:
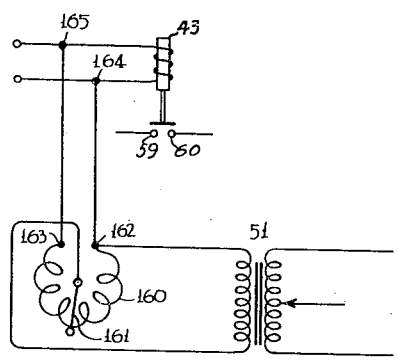

One of the primary objects of the voltage system of this invention is to eliminate as far as possible all elements of the circuit which are not essential to the obtaining of an efficient weld whereby a unit of pronounced lightness may be available. Another object of the invention is to provide a capacitor type welding unit having a control including electronic elements of which only those capable of standing the roughest use are retained. An important object of the invention is to provide a capacitor welding system which may be utilized with any ordinary power supply including a portable power supply. Another object is to provide a welding system in which the charging rate is controlled to within approximately 2% of the desired charging potential, whereby practical uniformity of charge is secured. An object is also to provide a circuit of the mentioned type in which the total amount of charge on the capacitors may be varied within a range adequate for all normal uses and without the employment of auxiliary current charging elements. Additional objects will appear on consideration of the inventive disclosure following and of the related accompanying drawings in which, Figure 1 is a wiring diagram of the power storage and supply system as applied to resistance welding;

Figure 2 is a detailed diagram of an auto transformer useable in connection to the circuit in Figure 1; and Figure 3 is a detailed diagram of a supplementary circuit which may be associated with the diagram of Figure 1.

Following the diagram of Figure 1, the numerals 10 and 11 indicate points of connection to a source of power which in this particular instance may be 110 volts at 60 cycles and may be derived from a local power supply system or from a generator unit on the field. A switch 12 connects this power to the main lines 13 and 14 of the circuit, the signal lamp 15 indicating closure of the main switch.

As is usual with resistance welding, means are supplied for introducing pressure to the electrodes of the welder so that a firm electrical contact may be made with the workpiece. Preferably, this pressure should be applied prior to the energization of the circuit. To accomplish these ends, a branch circuit 16 is taken off the main circuit through switches 17 to a motor 18, the function of which is to operate the pump P to develop pressure in the tank T. From this tank a pipe line 19 leads to the fluid cylinder operating the electrodes.

In order that the electrodes may be in pressure engagement with the workpiece before the electrical contacts of the circuit are made, there is interposed in the pipe line 19 adjacent the tank T circuit valve 20, pressure valve 21 and two circuit contacts 22, together with a switch 23 pivoted on the pipe at 24 and provided with a contact plate 25 at its free end adapted to bridge the contacts 22 when brought into closed position against the expansive action of spring 26.

Circuit valve 20 may be of any desired form, the drawing illustrating diagrammatically a piston 27 movable in the switch casing, the piston having a rod extending from its casing into pivoted engagement with the arm of the welder. The pressure switch includes a cylinder 28 with its interior connecting with the pipe line there being within the cylinder a movable piston 29 having a rod carrying a contact bar 30 adapted to engage the contact points 31 of the circuit. A spring 32 normally holds the contact bar in disengaged position in the absence of pressure in the pipe line. In operation, when the switch 25 is moved toward the pipe line, air pressure immediately develops in the electrode pressure cylinders, and at the same time, the pressure switch contact 30 closes the circuit at points 31 and, finally, contact plate 25 bridges circuit contacts 32.

Power received from the mains 10 and 11 is led through control circuits generally indicated by the numeral 35 to the capacitor bank 36. This bank may be of any number of storage units as desired, the numerals 37, 38 and 39 indicating three for purposes of illustration. The control unit by means of which the various capacitors of the bank receive uniform successive charging periods will now be described. Four relays are employed in the controlling section 35 of the circuit, 40, 41, 42 and 43. Relay 40 is connected in the branch circuit including the pressure contact 30 and lever switch 25 and on energization closes contacts 44 and 45 thereby completing a circuit across the mains 13 and 14 through the pilot lamp 46 and the relays 41 and 42. Energization of relay 41 closes contacts 47, 48, 49, 50 of a cross-main circuit including relay 43 and the rectifier transformer 51. Energization of relay 42, which is a time delay relay, brings about a delayed opening of contacts 52, 53 in the relay circuit 41, the relay moving against the resistance of the piston in the time delay element 54 connected to the core of the relay. On escapement of the contact range 55 of this relay from the contacts 52 and 53, a subsequent engagement is made with contacts 56 and 57 to close a cross branch circuit including igniter relay 58 and contacts 59 and 60 of the relay 43 and contacts 61 and 62 to the relay 40. Contacts 59 and 60 are normally closed in de-energized position whereas contacts 61 and 62 are normally open.

In addition to the contacts heretofore mentioned as operable by relay 40 are contacts 63 and 64 which are normally closed, these contacts lying in a circuit including a ratchet relay as will be hereinafter explained.

The rectifying charging circuit 36 and the associated discharge branch circuit 70 will now be described. As previously mentioned, the rectifier transformer 51, connected to the branch circuit of relay 43, is subject to the energization of relay 41. The primary 71 of this transformer is provided with a plurality of taps 72 having terminals 73 susceptible to engagement by a pivoted arm 74 connected to relay circuit 43. By this means it is apparent that a step-by-step selection may be made of the transformer ratio whereby a variation in current may be transmitted to the secondary 75 of the transformer. The two ends 76 and 77 of the transformer secondary are each connected to gaseous type diode rectifiers 78 and 79 as shown, the filaments of these diodes being supplied from the filament transformer 80 connected across the mains 13 and 14. Extending from the diodes 78 and 79 is the conductor 81 forming one side of the charging circuit, the other side 82 leading from a central tap on the secondary 75 of the rectifier transformer. These two conductors 81 and 82 are bridged by the capacitor bank 37, 38 and 39 through switch terminals 83, 84 and 85 and the variable contacting switch 86. By means of these switches as indicated, in conjunction with the variable tap arrangements of the primary 71 of the rectifier transformer, it appears for the connections as shown that a variation of eighteen stored energy values in capacitance are obtainable. This range may be readily extended with the addition of more capacitors or more taps to the transformer. The resistor 87 as placed in the conductor 81 affords protection against excessive charging current.

The discharge branch 70 of the circuit is formed in direct extensions of the conductors 81 and 82 of the charging circuit 36 and includes the main conductors 90 and 91. In the conductor 90 is interposed a gaseous discharge power tube 92 of the ignitron type including a liquid pool of mercury for the cathode and the igniter element 93. The conductors 90 and 91 connect to the primary 94 of the welding transformer 95 through reversing switches whereby the direction of current through the transformer primary is reversed for each successive welding impulse. To accomplish this reversal two branch circuits 96 and 97 are used each including two sets of contacts and each connected to the primary of the transformer. Relay arms 98 and 99 operable by relays hereinafter described function to close first one branch set of contacts and then the other. For example, when relay switch 98 is in the position as shown, the branch circuit 96 is closed to transmit a one way current from conductor 90 through the transformer in one direction to the conductor 91, switch means 99 being open. Also when the reverse position exists with the switch 98 open and 99 closed, a one way current will pass to conductor 91 through the transformer primary 94 in the opposite direction thereby energizing the secondary 100 and passing welding current through the electrodes 101. The purpose of the current reversal is to prevent saturation of the welding transformer core with resultant loss to the welding transformer output. An overload non-linear resistor 102 is placed in shunt with the secondary 100 of the transformer merely as a precaution for open circuit secondary discharge.

Provision for the application of potential to the igniter element of the ignitron 92 is made in the capacitor-resistor network 105, the same being in shunt with the ignitron. This network includes two capacitors 106 and 107 each of which is connected in parallel with resistors 108, 109 so that capacitor 106 and resistor 108, and capacitor 107 and resistor 109 form two parallel branches each in series with the other and the whole being in shunt with the ignitron. The junction point 110 between the resistors and capacitors is connected to the igniter 93 of the ignitron through switch contacts 111 and 112 bridged by the switch 113 of relay 58 which as hereinbefore mentioned is energized through activation of the time delay relay 42. Since either one of the reverse switches of branches 96 and 97 of the welding transformer are always closed, the potential across the ignitron is that of the capacitors 37, 38 and 39. Hence, the network 105 provides a means for establishing a reduced potential for the igniter according to the relationship $E107$ equals $E$ across both capacitors times capacitance 106 divided by the sum of capacitances of 106 and 107. The function of the resistors 108 and 109 is to smooth out and stabilize the voltage drop across the condensers. The value of potential on the igniter is chosen so as to secure the optimum igniter efficiency.

The reversing control unit 115 as indicated is connected across the power source main 13, 14. This unit includes the base indicated in outline by the numeral 116 on which are mounted a telephone type relay 117 with an associated ratchet-wheel 118 and contact pinions 119 and 120. The relay 117 includes an inductance coil 121 having a magnetic core 122 adapted to attract, when energized, the armature 123 of the ratchet operating structure 124. This structure consists of a lever arm 125 fixedly connected to the armature 123 and pivoted at 126 an intermediate point on the arm 125 carrying a freely pivoted arm 127 having a free end adapted to engage the teeth 128 on the periphery on the ratchet-wheel 118. A spring connects the pivoted arm 127 to the outer end of the arm 125 so as to keep the pivoted arm on a tooth of the ratchet-wheel after successive ratchet movements. A spring is also connected between a fixed point and the lever arm 125 to move said arm normally in a direction to separate armature 123 and core 122. It is evident that energization of the coil 121 serves to operate the ratchet lever arm to move the ratchet step-by-step.

Rotation of the ratchet-wheel 118 is extended directly to a shaft 130 connecting the two contact cams 119 and 120. Inspection of the drawing reveals that these cams are each formed of regularly spaced arms on the outer end of which are depressions adapted to form recesses 131 for projections 132 formed in spring contact arms 133. It is also apparent that while the cams 119 and 120 are identical in construction, the cam 120 is rotated 45° with reference to the cam 119 so that when the notch 132 of the spring contact plate 133 engages the cooperating notch 131 of cam 119, arms of the cam 120 are displaced, the effect of this positioning being to cause the separation of the cam contacts 170 and to permit closure of the cam contacts 171. In operation when the ratchet-wheel 118 is rotated a distance between two successive teeth by the lever action of the lever 124, first one cam is opened while the other one is closed and then the reverse takes place.

Having described the various elements and devices entering into the circuit, consideration will now be given to the operation considered as a whole in the practice of intermittent resistance welding. The main power switch 12 is closed. Thereupon power is applied to the mains 13 and 14 which lights the signal lamp 15 and heats the filaments of the rectifier tubes 78 and 79 through the transformer 80. Also current passes through the ratchet relay 117 which includes the contacts 63 and 64 closed by the switch mechanism of relay 40. Thereupon the ratchet mechanism 124 and 118 is motivated to rotate the cams 45°, thus effecting closure of one of the contacts 160 or 161 to insure a given direction of current flow to the primary of the welding transformer 95. The workpiece may now be inserted between terminals of electrodes 101.

The switch 17 is now closed, the operator compressing the switch arm of the manual switch 23 bringing about first an opening of the air line from the air tank T to the welding electrode pressure cylinder thereby insuring a firm grasp of the electrodes on the workpiece and a satisfactory electrical conductivity between the electrode tips and the workpiece. Simultaneously, the pressure in the pipe line 19 energizes the pressure switch 21 moving the switch bridge 30 into engagement with the contacts 30 and 31. Further movement of the arms of switch 23 brings the switch plate 25 into engagement with the contacts 22 thus completing the circuit through the relay 40 and energizing the same.

Energization of relay 40 breaks contacts 63 and 64 of the ratchet-relay circuit and also closes contacts 44, 45 and 61, 62. Closure of contacts 44, 45 brings about energization of relay 41 and the time delay relay 42, as well as illumination of pilot lamp 46. Energization of power control relay 41 closes switches 47, 48 and 49, 50 through the relay 43 and also energization of the transformer 51, thereby, with contact arms 74 and 86, completing the proper charging circuits into the capacitor bank 37, 38 and 39. The charging current is, of course, a direct current being rectified by the diode tubes 78 and 79 in the usual manner.

The voltmeter V in shunt with the capacitors indicates the degree of charge on the capacitors. During the charging step the delay action relay 42 is maintaining contacts 52, 53 closed but at a predetermined time interval, the capacitors having received their full amount of charge, these contacts are opened and contacts 56, 57 closed thus closing a circuit through the igniter circuit relay 58 bringing about closure of contacts 111, 112 in the igniter circuit and the striking of the arc in the ignitron 92. Since relay 58 can not be energized until contacts 52, 53 of relay 42 are broken, it is apparent that it is impossible to discharge the capacitor bank until after the charging connections are broken.

The ignitron welding current is conducted through the weld transformer 94 in such direction as is pre-arranged by the reversing contact branch circuit 115, flow of welding current through the workpiece thereby resulting to effect the desired weld. On the completion of the weld the operator opens the manual switch 23 thereby breaking the circuit of relay 40 and consequently that of igniter relay 58 and relays 41 and 42 whereupon the circuit is restored to the initial condition preparatory to a new welding cycle.

Desirably the capacitor bank should be discharged completely of any residual charge on completion of a complete welding operation, and this may be done effectively by means of a manual switch at 140, closure of which energizes the solenoid 141 to close contacts 142 and 143 through a resistor 144 in shunt with a capacitor bank thus permitting discharge of any residual current within the bank. Ordinarily this control is not used after each individual weld.

On the opening of the circuit through manipulation of switch 23 an electric circuit is once more established through ratchet coil 117 to cause a 45° rotation of the ratchet cams 119 and 120 thereby conditioning the circuit for a reverse current flow through the primary of the welding transformer 95. If it is desired further to modify the amount of charge effective at the welding electrodes, such modification may be made by manipulation of the contact arm 74 of the rectifying transformer or by selection of a number of capacitors for charging and discharging by movement of switch 86.

The constants of the discharge circuit are preferably chosen so as to bring an oscillatory discharge from the capacitor bank. One reason for so doing is to obtain as far as possible a wave form suitable for high concentration of electrical energy in an exceedingly reduced interval of time. Experimentation has determined that, as brought out in the copending application of Comfort A. Adams, Serial No. 452,384, assigned to the assignee of this application, and now Patent No. 2,415,573, dated February 11, 1947, a welding time in excess of about 0.002 second will result in wastage of energy through heat leakage. It has been established that in the ordinary resistance weld the amount of energy lost in leakage is as high as six times the amount of energy needed for weld only. Hence, an oscillatory discharge attained by a reduction of the value of the resistance and inductance to practical minimum values and further by a substantial reduction in the turn ratio of the welding transformer is highly desirable.

However, under certain conditions the reversal of current due to the oscillatory flow is substantial and of such a magnitude as to bring about an undesirable rapid disintegration of the structure of the capacitors and under such circumstances it may be desired to supplement a circuit as shown in Figure 1 with the additional branch circuit as shown in Figure 2. This supplementary circuit has terminals 150, 151, 152 and 153 which coincide with the terminals with the same number at the welding end of the circuit of Figure 1 and comprises a gas diode tube 154, a plate of which is connected to one side of the welding transformer. The other side of the transformer has connection to the cathode of this tube, the polarity of the tube being opposed to that of the direction of current flow through the ignitron. The filament of this diode is heated from the transformer 156 connected across the power main 13 and 14. It appears that when the discharge current wave passes through zero the diode 154 will afford a short circuiting path tending to maintain the negative current flow close to zero point of voltage; and equal to the ionizing potential of tube 154.

In Figure 3 is indicated a modified branch circuit arrangement for limiting charging current into the capacitor bank. This modification includes an autotransformer 160 having a variable contact arm 161 connected to one side of the rectifying transformer 51, and the end of the autotransformer 162 having connection to the other transformer end of the primary transformer. The two transformer ends 162 and 163 are connected to points 164 and 165 in the circuit of relay 43 as indicated in Figure 1. Variation of the position of the arm 161 of the autotransformer brings about a change in the amount of current passing to the rectifying tubes. An advantage of this construction lies in its exact control of current variation; however, for field purposes preference is given to the attached transformer arrangement in Figure 1 because of the increased lightness and since the adjustment as secured by the attached variation has been found to be adequate for most practical purposes. It is important to note that good accuracy of the final charge on the condensers is obtained by employment of a time delay relay 42. The charge is allowed to build up to the flat portion of the charging curve so that variations in line regulation will be minimized. Thus the capacitors charge to about 90% peak value and this may be accomplished at any time rate desired by choosing rectifier tubes 78 and 79 of sufficient capacity, and by providing good line regulations. In any event, this charging time need not exceed one second and may be decreased to 15 cycles or ¼ second if desired.

While I have shown a circuit and circuit elements which have been found practical and useful, modifications of the specific arrangements as shown may, of course, be made limitations being imposed on the scope of my invention only to such extent as may be indicated by the claims hereunto appended.

What is claimed is:

1. In a capacitor discharge system, a charge circuit including an electric power source and capacitor, a load circuit connected to the charge circuit, and means connected to said circuit for producing a single charge-discharge sequence in said system, said means comprising a time delay relay, switch contacts in the charge circuit operated by the relay, and switch contacts in said discharge circuit operated by said relay, said charge and discharge contacts being operated only in charge-discharge sequence in one operation of said relay and said relay being energizable only by flow of current from said power source.

2. In a capacitor discharge system, a charge circuit including an electric power source and capacitor, a load discharge circuit connected to the charge circuit, and means connected to said circuits for producing a single charge-discharge sequence in said system, said means comprising a time delay relay connected to said power source and having an armature movable to capacitor charge and discharge positions, charge circuit switch contacts adapted for closure by said armature when in charge position and discharge circuit switch contacts adapted for closure by said armature when in discharge position.

3. In a capacitor discharge system, a charge circuit including an electric power source and capacitor, a load circuit connected to the charge circuit including a transformer, and means connected to said circuit for producing a single charge-discharge sequence in said system, said means comprising a time delay relay connected to said source, switch contacts to the charge circuit operated by the relay, switch contacts in said discharge circuit operated by said relay, and means including a rectifier for reducing current flow from the capacitor through the welding transformer in a direction opposite to that of the initial capacitor discharge through said transformer.

EDWIN M. CALLENDER.

REFERENCES CITED

The following references are of record in the file of this patent:

UNITED STATES PATENTS

| Number | Name | Date |
|---|---|---|
| 472,193 | Marshall | Apr. 5, 1892 |
| 1,168,346 | Thomson | Jan. 18, 1916 |
| 2,077,600 | Watson | Apr. 20, 1937 |
| 2,085,100 | Knowles | June 29, 1937 |
| 2,179,105 | Sidney | Nov. 7, 1939 |
| 2,250,102 | Klemperer | July 22, 1941 |
| 2,295,293 | Rogers | Sept. 8, 1942 |
| 2,315,093 | Languepin | Mar. 30, 1943 |